(12) United States Patent
Holler

(10) Patent No.: US 6,371,844 B1
(45) Date of Patent: Apr. 16, 2002

(54) DISPOSABLE SKINNER

(76) Inventor: Christopher A. Holler, 2449 Via Sienna Ave., Winter Park, FL (US) 32789

( * ) Notice: Subject to any disclaimer, the term of this patent is extended or adjusted under 35 U.S.C. 154(b) by 0 days.

(21) Appl. No.: 09/619,138

(22) Filed: Jul. 18, 2000

(51) Int. Cl.[7] ............................................. A22B 5/16
(52) U.S. Cl. .................... 452/132; 452/125; 30/278; 30/289; 30/294
(58) Field of Search .................. 452/132, 125; 30/287, 294, 329, 335, 339, 356, 155

(56) References Cited

U.S. PATENT DOCUMENTS

| | | | |
|---|---|---|---|
| 3,839,788 A | * 10/1974 | Addis | 30/287 |
| 4,607,432 A | * 8/1986 | Montgomery | 452/132 |
| D362,168 S | * 9/1995 | Mancini | 30/162 |
| 5,724,738 A | * 3/1998 | Ballarini | 30/294 |
| D401,492 S | * 11/1998 | Joseph, Jr. | 30/294 |
| 5,881,463 A | * 3/1999 | Casteel et al. | 30/280 |

* cited by examiner

Primary Examiner—Peter M. Poon
Assistant Examiner—Floris C Copier
(74) Attorney, Agent, or Firm—Greenberg Traurig. LLP; Anthony R. Barkume

(57) ABSTRACT

A hand held skinner having a handle portion, a base portion and a neck portion connecting the handle portion to the base portion. The base portion has finger portions extending from the neck portion toward a first and second tip respectively. The fingers are angularly spaced apart to define a channel therebetween. A cutting member is mounted so as to transverse the channel.

11 Claims, 2 Drawing Sheets

DISPOSABLE SKINNER

TECHNICAL FIELD

The present invention relates generally to game skinning devices and more particularly to a hand held disposable skinner.

BACKGROUND OF THE INVENTION

When gutting a carcass, it is necessary to cut the epidermis from the genitalia to the bottom of the chest cavity. The method most often used by hunters is to cut a slit in the skin, insert two fingers into the slit or incision, place a knife between the fingers and carefully cut the skin. A disadvantage to this method is that if the hunter cuts too deeply the sub dermal layers can be punctured resulting in a mess as well as an unpleasant odor.

Accordingly, there is a need for a portable skinner that will allow a hunter to skin a carcass in the field while reducing the risk of the sub dermal layers being ruptured.

SUMMARY OF THE INVENTION

An object of this invention is to provide a portable skinner that will allow a hunter to skin a carcass in the field while reducing the risk of the sub dermal layers being ruptured.

Another object of the present invention is to provide a method for skinning a carcass in the field.

The present invention achieves these objectives by providing a hand held skinner having a handle portion, a base portion and a neck portion connecting the handle portion to the base portion. The base portion has finger portions extending from the neck portion toward a first and second tip respectively. The fingers are angularly spaced apart to define a channel which in the preferred embodiment resembles a "V" with a rounded bottom. A cutting member is mounted so as to transverse the channel.

In operation, an incision is cut into the skin of the dead animal. Holding the handle, the two finger portions are slid into the incision. As the skinner is pulled or pushed through the incision, the tips pull the skin away from the sub-dermal layers and pass it through the channel. The cutting member then cuts the pulled away skin. After the cutting is complete, the skinner can be disposed of.

Thus, a portable skinner is provided that allows a hunter to skin a carcass in the field while reducing the risk of the sub dermal layers being ruptured.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
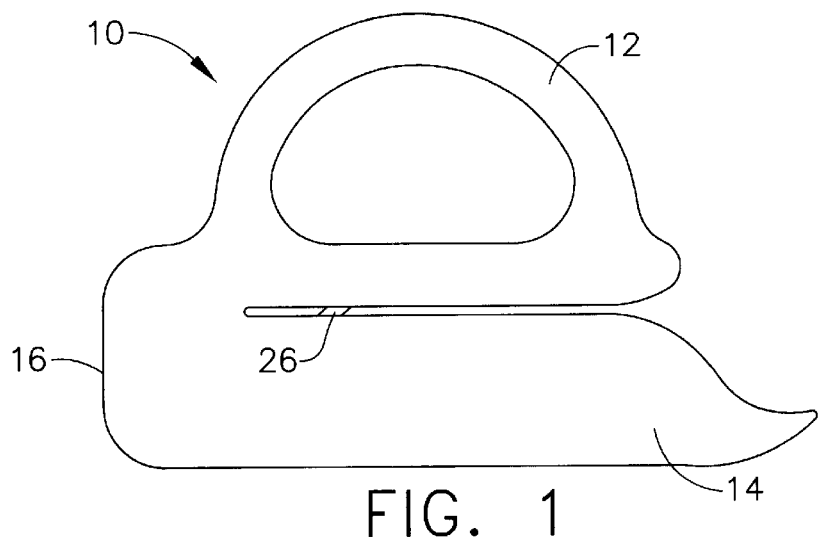
FIG. 1 is a side view of the skinner contemplated by the present invention.
Figure 2:
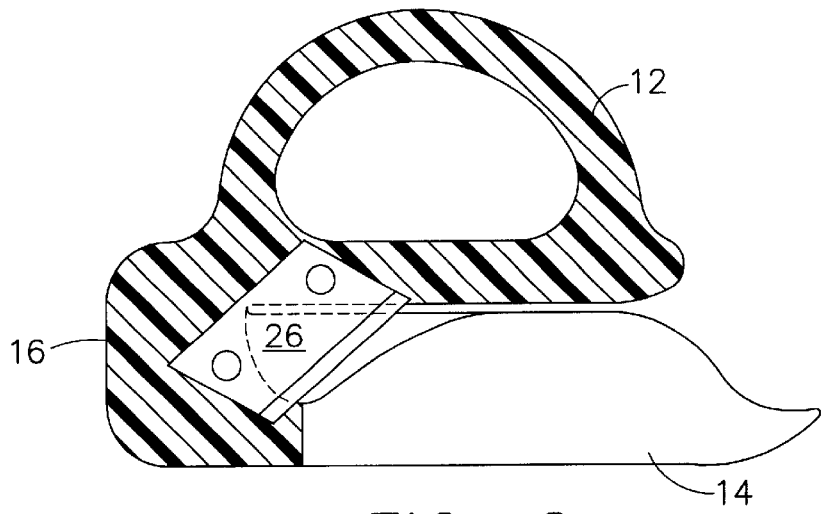
FIG. 2 is a cross-sectional view taken along the centerline of FIG. 1.
Figure 3:
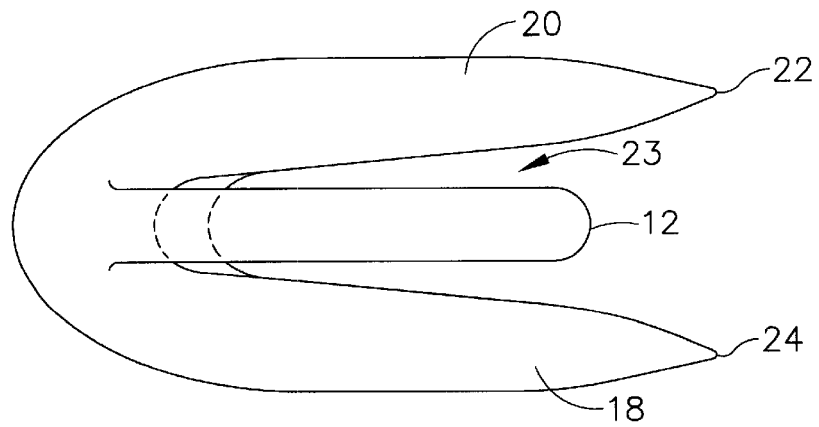
FIG. 3 is a top view of the skinner of FIG. 1.

Referring to FIGS. 1 through 3, a skinner is generally denoted by reference number 10. The skinner 10 has a handle portion 12, a base portion 14 and a neck portion 16 connecting the handle portion 12 to the base portion 14. The base portion 14 has two finger portions 18 and 20 that extend an equal distance out from the neck toward upward pointing tips 24 and 22 respectively. The two finger portions 18, 20 are angularly spaced apart to form a channel 23 therebetween as they extend outward from the neck portion 16. In the preferred embodiment, the channel 23 has a shape that generally resembles a "V" with a rounded bottom. Crossing the channel 23 and extending from the handle portion 12 to the bottom of the neck portion 16 is a cutting member 26. The cutting member 26 may be a conventional razor blade or some other device having an edge sharp enough to cut the skin of a carcass. Alternatively, the cutting edge 26 may extend from the handle portion 12 to the base portion 14. In the preferred embodiment, the skinner 10 is a single piece made from a thermoplastic mold with the cutting member 26 embedded in the mold. Alternatively, the skinner 10 can be made of two parts, each part being mirror images of the other along the centerline of the skinner as shown in FIG. 2. The two parts can be glued together or attached with a mechanical fixture such as a screw or rivet.

Figure 4:
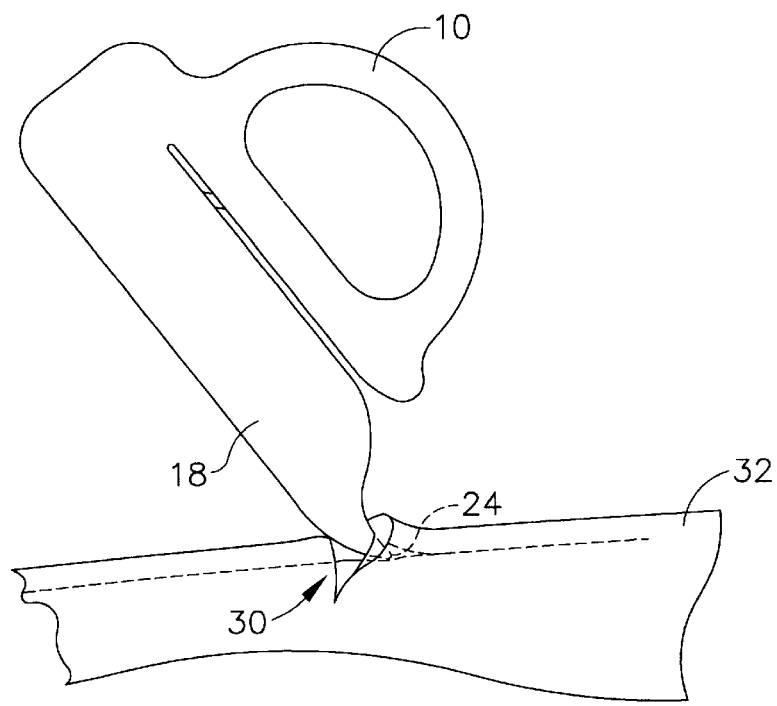
FIGS. 4 and 5 illustrate the use of the skinner of FIG. 1.
Figure 5:
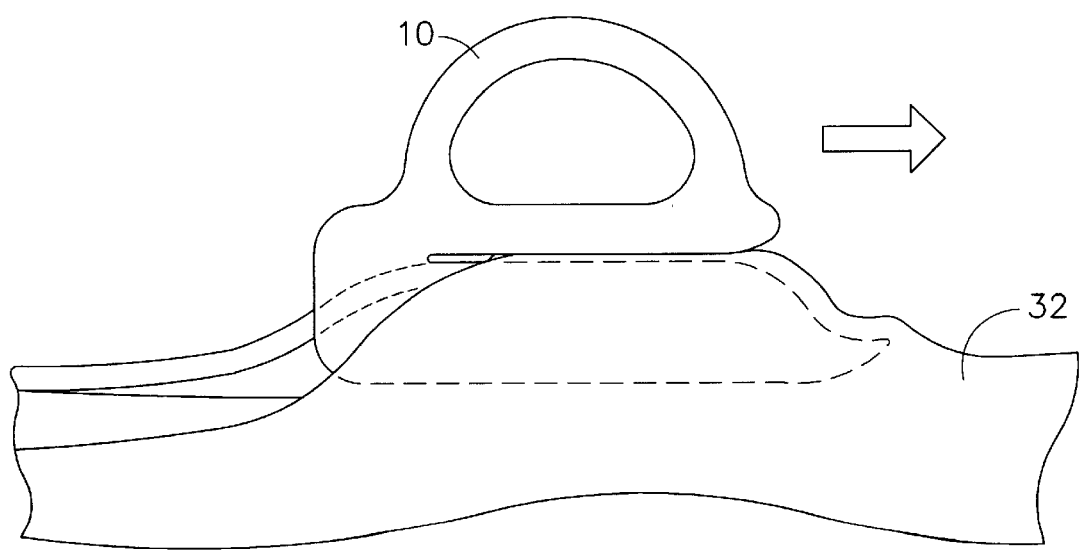

Referring to FIGS. 4 and 5, in operation a slit 30 is made in a manner familiar to those skilled in the art in the skin 32 of an animal. The two finger portions 18 and 20 are then inserted into the incision. As the skinner is pulled or pushed through the incision, the tips 22 and 24 pull the skin away from the sub-dermal layers and then the cutting member 26 cuts the pulled away skin.

Thus, a portable skinner 10 is provided that allows a hunter to skin a carcass in the field while reducing the risk of the sub dermal layers being ruptured. The skinner 10 is also relatively inexpensive to manufacture and therefore can be thrown away after a single use, thus avoiding the messy and unpleasant task of having to clean the skinner.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A skinner comprising
   a handle portion,
   a base portion and
   a neck portion connecting the handle portion to the base portion,
   said base portion having first and second finger portions extending from said neck portion toward a first and second tip respectively,
   said first and second fingers angularly spaced apart to define a channel therebetween; and
   a cutting member crossing the channel and extending from the handle portion to the bottom of the neck portion;
   said first and second fingers extending generally parallel with a bottom portion of the handle portion wherein the space between the top surfaces of the first and second finger portions and the bottom portion of the handle portion is sufficient to allow skin of an animal carcass to pass therethrough but which prevents a human finger from passing therethrough and making contact with said cutting member.

2. The skinner of claim 1 wherein said channel has a "V" shape with a rounded bottom.

3. The skinner of claim 2 wherein said razor is connected at a first end to said handle portion.

4. The skinner of claim 3 wherein said razor has a second end connected to said base portion.

5. The skinner of claim 3 wherein said razor has a second end connected to said neck portion.

6. The skinner of claim 1 wherein said handle portion and said base portion are integral with said neck portion.

7. The skinner of claim 1 wherein said cutting member is a razor blade.

8. The skinner of claim 1 wherein the skinner is a single piece made from a thermoplastic mold with the cutting member embedded in the mold.

9. The skinner of claim 1 wherein the skinner comprises two attached parts with the two parts being mirror images of each other.

10. A method for skinning an animal carcass in the field comprising the steps of:

providing a skinner having a handle portion, a base portion and a neck portion connecting the handle portion to the base portion, said base portion having first and second finger portions extending from said neck portion toward a first and second tip respectively, said first and second fingers angularly spaced apart to define a channel therebetween; and a cutting member crossing the channel and extending from the handle portion to the bottom of the neck portion; said first and second fingers extending generally parallel with a bottom portion of the handle portion wherein the space between the top surfaces of the first and second finger portions and the bottom portion of the handle portion is sufficient to allow skin of an animal carcass to pass therethrough but which prevents a human finger from passing therethrough and making contact with said cutting member;

making an incision in the carcass;

inserting the first and second finger portions into the incision;

moving the skinner so that the first and second tips pull the skin away from the sub-dermal layers; and continuing to move the skinner so that the cutting member cuts the skin.

11. The method of claim 10 further comprising the step of disposing of the skinner after a single use.

* * * * *